July 16, 1929.  C. B. JACOBSEN  1,721,219
AUTOMATIC TRANSMISSION FOR MOTOR VEHICLES
Filed April 24, 1928
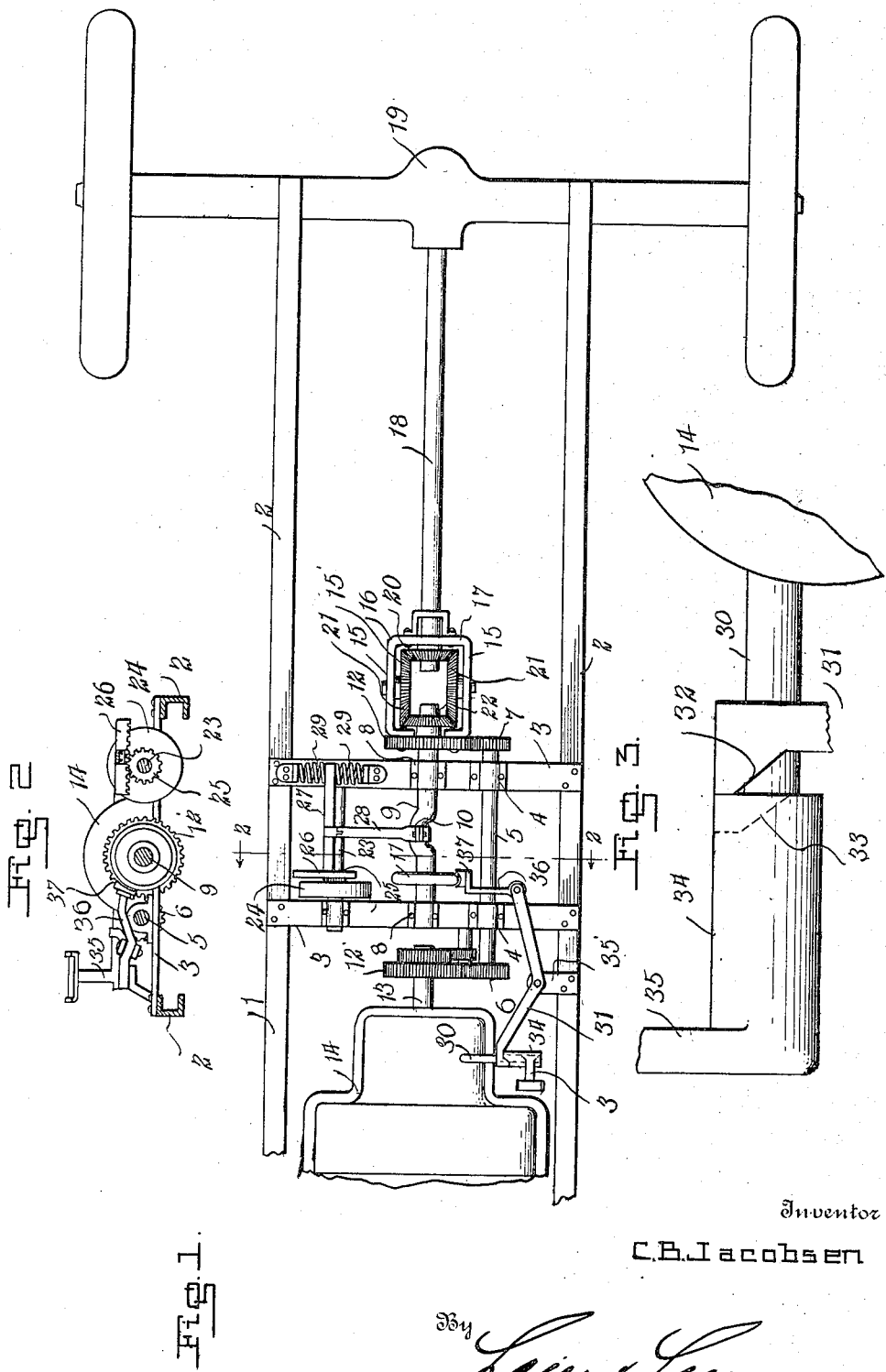
Inventor
C. B. Jacobsen
By Lacey & Lacey, Attorneys Patented July 16, 1929.

1,721,219

UNITED STATES PATENT OFFICE.

CARL B. JACOBSEN, OF CHILOQUIN, OREGON.

AUTOMATIC TRANSMISSION FOR MOTOR VEHICLES.

Application filed April 24, 1928. Serial No. 272,508.

The present invention is directed to improvements in automatic transmissions for motor vehicles, and other power driven machinery.

The primary object of the invention is to provide a device of this character constructed and arranged in such manner as to eliminate the necessity of shifting gears.

Another object of the invention is to provide a device of this kind wherein the power of the vehicle will be increased and the operation simplified.

With these and other objects in view, this invention resides in the novel features of construction, formation, combination and arrangement of parts to be hereinafter more fully described, claimed and illustrated in the accompanying drawing, in which,—

Figure 1 is a plan view of the device.

Figure 2 is a sectional view on line 2—2 of Figure 1.

Figure 3 is a detail view of the clutch pedal.

Referring to the drawing, 1 designates the frame of a motor vehicle, and to the side bars 2 of which are secured the ends of the spaced crossed bars 3—3 having diametrically opposed boxes 4 in which are journaled the ends of the main driving shaft 5, the front and rear ends thereof having fixed thereto pinions 6 and 7, respectively, the purpose of which will be later explained.

Spaced from the boxes 4 are boxes 8 and in which is journaled a shaft 9 provided with a crank arm 10, said shaft having a brake wheel 11 fixed adjacent its forward end, while loosely mounted on the rear end thereof, is a gear 12 which is adapted to mesh with the pinion 7. The pinion 6 is in mesh with the gear 12 fixed to the rear end of the shaft 13 of the engine 14.

Fixed to the gear 12 are the forward ends of the side bars 15 of the frame 16 for supporting the planetary gearing 15', the rear ends of which are integrally connected by cross bars 17 and in which is journaled the forward end of the shaft 18, said shaft being extended into the usual differential housing 19 and connected with the gear thereof, as customary.

The forward end of the shaft 18 has fixed thereon a bevel gear 20 which meshes with the planetary gears 21 rotatably supported by the side bars 15, said gears being also in mesh with a beveled gear 22 fixed to the rear end of the shaft 9, the aforementioned gears constituting the planetary gearing.

Journaled transversely upon the bar 3 is a shaft 23 which has fixed thereto an inertia wheel 24 having a pinion 25 fixed thereto which is engaged with a rack bar 26. This rack bar has fixed thereto the forward end of the bar 27 which has pivotally connected thereto the outer end of the pitman 28, the inner end of the pitman being pivoted to the crank 10. The rear end of the bar 27 is mounted between the opposed ends of the coil springs 29—29 which are alternately compressed and expanded when the rack bar is reciprocated through the medium of the pitman 28 and crank 10. The springs 29—29 are suitably supported upon the rear cross bar 3 and serve to absorb shock incident to the oscillation of the wheel 24.

A shaft 30 leads from the clutch collar of the engine, not shown, and slidably engaged thereon is one end of the lever 31. A cam 32 adapted to coact with the cam 33 is carried by the sleeve 34, said sleeve being rockable on the shaft 30 and carries a foot pedal 35. The lever 31 is pivotally connected intermediate its ends to the bracket 35' secured to the adjacent bar 2.

To the rear end of the lever 31 is pivotally connected the inner end of the link 36 which has a brake shoe 37 suitably fixed thereto for engagement, at times, with the periphery of the brake wheel 11.

Any appropriate means may be employed for holding the clutch pedal 35 in adjusted position, and since the pedal controls a clutch mechanism of well known construction a detailed description thereof is not thought necessary.

It will be observed that when starting the vehicle from a standstill the shaft 18 will be harder to rotate than the shaft 9 which oscillates the inertia wheel 24, therefore the engine will lose some speed through the inertia wheel and its connection, which furnishes more power impulses for revolution of the shaft 18. As soon as the vehicle gains some speed the shaft 18 will rotate with less resistance through the planetary gearing, and will therefore rotate faster than said gearing. It will thus be seen that the wheel 24 provides a constant resistance and is easier to rotate than the shaft 18 at the start, but will obvious be harder to rotate than the shaft 18 after starting resistance of the shaft 18 has been overcome.

When the brake shoe 37 is engaged with the periphery of the wheel 11 the resistance unit is locked which permits the shaft 18 to make two revolutions to one revolution of the gear 12.

After the engine is started the clutch is moved half way out until the car has gained some speed, after which the clutch is fully let out and at which time the brake shoe locks the wheel 11 and shaft 9 for high speed since the resistance is now lacking.

I have described the device as used in connection with motor vehicles, but it will be of course understood that it can be used with equal success for hoists, cranes, power shovels and so forth.

From the foregoing, it is thought that the construction, operation and many advantages of the herein described invention will be apparent to those skilled in the art without further description, and it will be understood that various changes in size, shape and proportion may be resorted to without departing from the spirit or sacrificing any of the advantages of the invention.

Having thus described the invention, I claim:

The combination with the engine shaft of a motor vehicle, of a main shaft driven thereby, a crank shaft having a gear loose thereon, a planetary gearing between the crank shaft and differential gearing of the vehicle, and coupled with said gear, a driving connection between the main shaft and gear, an inertia wheel having a pinion fixed thereto, a pitman operable by the crank shaft and having a rack bar connected therewith for engagement with the pinion, for driving the inertia wheel, and means for arresting the movement of said wheel.

In testimony whereof I affix my signature.

CARL B. JACOBSEN. [L. S.]